US006838488B2

(12) United States Patent
Sasaki et al.

(10) Patent No.: US 6,838,488 B2
(45) Date of Patent: Jan. 4, 2005

(54) PRODUCTION METHOD OF FOAMED POLYPROPYLENE RESIN BEADS

(75) Inventors: Hidehiro Sasaki, Tochigi-ken (JP); Kazuya Ogiyama, Tochigi-ken (JP); Akinobu Hira, Tochigi-ken (JP); Keiichi Hashimoto, Tochigi-ken (JP); Hiroki Yanagisawa, Tochigi-ken (JP); Hisao Tokoro, Tochigi-ken (JP)

(73) Assignee: JSP Corporation, Tokyo (JP)

( * ) Notice: Subject to any disclaimer, the term of this patent is extended or adjusted under 35 U.S.C. 154(b) by 239 days.

(21) Appl. No.: 10/163,366

(22) Filed: Jun. 7, 2002

(65) Prior Publication Data

US 2003/0034580 A1 Feb. 20, 2003

(30) Foreign Application Priority Data

Jun. 11, 2001 (JP) .................................... 2001-176084

(51) Int. Cl.[7] .................................................. C08J 9/16
(52) U.S. Cl. ............................ 521/56; 264/50; 264/53
(58) Field of Search ............................ 521/56; 264/50, 264/53

(56) References Cited

U.S. PATENT DOCUMENTS 4,618,468 A * 10/1986 Rigler et al. .................. 264/53
4,676,939 A    6/1987 Kuwabara
5,340,841 A    8/1994 Tokoro et al.
6,034,144 A    3/2000 Shioya et al.
6,077,875 A    6/2000 Sasaki et al.
6,130,266 A * 10/2000 Mihayashi et al. ........... 521/58
6,313,184 B1 * 11/2001 Sasaki et al. .................. 521/56

FOREIGN PATENT DOCUMENTS

| JP | 52-76372    | 6/1977 |
| JP | 59-172532   | 9/1984 |
| JP | 10-060148   | 3/1998 |
| JP | 2001-164024 | 6/2001 |

* cited by examiner

Primary Examiner—Allan R. Kuhns
(74) Attorney, Agent, or Firm—Sherman & Shalloway

(57) ABSTRACT

A method for producing expanded polypropylene resin particles wherein polypropylene resin particles impregnated with a physical blowing agent are heated along with an aqueous medium and a dispersant and are released and expanded at reduced pressure from the interior of a pressure-tight vessel, wherein the aforementioned aqueous medium has an electrical conductivity of from not less than 0.00 ms/m to not more than 20.00 mS/m. The resulting particles obtained are without inconsistencies caused by differences in the amount of dispersant adhering to the particles or the amount of dispersant added to prevent the particles from fusing together during the heat treatment step of the method.

19 Claims, 2 Drawing Sheets

US 6,838,488 B2

PRODUCTION METHOD OF FOAMED POLYPROPYLENE RESIN BEADS

BACKGROUND OF THE INVENTION

1. Field of the Invention

The present invention relates to a method for producing expanded polypropylene resin particles, wherein expandable polypropylene resin particles containing a physical blowing agent are released and expanded at reduced pressure from the inside of a pressure-tight vessel to give expanded particles. More particularly, the invention relates to a method for producing expanded polypropylene resin particles in which the particles are prevented from fusing together in the step for expanding the resin particles, and the resulting expanded particles fuse together better when the expanded particles are molded.

2. Description of the Related Art

Moldings comprising polypropylene resin formed into a desired shape (hereinafter referred to as expanded particle moldings) enjoy the advantages of properties such as impact resistance and heat insulation without sacrificing the outstanding properties inherent to polypropylene resin, and are thus widely used as packaging materials, construction materials, heat insulation materials, and the like.

Compared to unexpanded resin moldings, expanded particle moldings are more light-weight and are less expensive starting materials, and they are also endowed with properties such as impact resistance and heat insulation, making them even better in terms of cost performance. On the other hand, although expanded particles and molded articles are light-weight, they are bulky, resulting in the problem of high transportation costs. Particularly when expanded particle molding products manufactured in Japan are shipped for sale overseas, the extremely high transportation costs result in the loss of the exceptional cost performance inherent to expanded particle moldings. Thus, in order to minimize the costs associated with transport, expanded particle moldings for sale overseas are generally produced there, from the production of the expanded particles to the production of the expanded molding.

However, such overseas production, from the expanded particles to the expanded moldings, often results in the problem of considerable variation in the quality of the expanded particle molding products due to differences between production plants.

In a commonly used method for producing expanded polypropylene resin particles, resin particles dispersed in aqueous medium are impregnated with a blowing agent in a pressure-tight vessel such as an autoclave, and the resin particles impregnated with the blowing agent are then released and expanded in a reduced pressure atmosphere from inside the vessel at a temperature which is at least the softening temperature of the resin particles. The primary materials used in the production of expanded particles are the blowing agent, aqueous medium, and polypropylene resin particles, but a dispersant is added to the aqueous medium beforehand to prevent the softened resin particles from fusing together or from adhering to the inner wall of the vessel during the step for heating the resin particles in the vessel. When a dispersant is added to the aqueous medium, a portion of the dispersant that is used adheres to the surface of the resulting expanded particles, but if too much adheres to the surface of the expanded particles, the resulting expanded particles will not fuse together when molded. A resulting problem is the lower mechanical strength of the expanded particle moldings that are obtained by molding such expanded particles. Studies by the inventors have shown that the minimum amount of dispersant (the minimum amount needed to prevent the resin particles from fusing together during the production of the expanded particles) vary considerably from plant to plant overseas, where the difference between plants using the lowest and greatest amounts of dispersant can be as much as 5-fold. The use of different amounts of dispersant from plant to plant can result in different amounts of dispersant adhering to the expanded particles from plant to plant. Such inconsistencies between the amounts of dispersant adhering to expanded particles and the amounts of dispersant used may be the cause of differences in the quality of the expanded particle moldings that are obtained by molding the expanded particles.

SUMMARY OF THE INVENTION

In an effort to resolve the drawbacks described above, an object of the present invention is to provide a method for producing expanded polypropylene resin particles for molding, which allows expanded particles of consistent quality to be produced in a consistent manner at any production plant, with less variation in the amounts of dispersant that are used and the amounts adhering to the expanded particles.

The present invention is a method for obtaining expanded particles by allowing polypropylene resin particles impregnated with a physical blowing agent, which have been heated along with an aqueous medium and a dispersant, to be released and expanded at reduced pressure from the interior of a pressure-tight vessel. The present invention features the use of an aqueous medium with an electrical conductivity of from not less than 0.00 mS/m to not more than 20.00 mS/m as the aqueous medium. A microparticulate inorganic substance is used as the dispersant in the present invention, preferably a mineral-based inorganic substance comprising an aluminosilicate such as kaolin based on silica-alumina. A dispersion reinforcer such as aluminum sulfate can also be used to reinforce the dispersion power of the dispersant. An inorganic blowing agent such as air or carbon dioxide is preferred as the physical blowing agent in the present invention. Expanded particles with an apparent density of from not less than 100 g/L to not more than 500 g/L are preferably obtained in the method of the present invention.

The expanded particles obtained in the present invention should have an endothermic peak on a DSC curve, as determined by differential scanning calorimetry, of at least 2, and the heat quantity of the endothermic peak on the high temperature side of the endothermic peak should be from not less than 2 J/g to not more tan 20 J/g. The amount of dispersant adhering to the surface of the expanded particles should be from not less than 50 mg to not more than 200 mg per 100 g by weight of the expanded particles (the sum weight of the weight of the expanded particles themselves and the weight of the dispersant adhering to the surface of the expanded particles).

The method of the present invention allows good expanded particles that do not fuse together to be obtained without increasing the amount of dispersant that is used when the expanded particles are produced, and also allows expanded particles to be obtained without the use of more dispersant, resulting in lower amounts of dispersant adhering to the surface of the expanded particles, so that the resulting expanded particles fuse together better when molded, giving expanded particle moldings with better mechanical strength and the like. As a result, the amounts of dispersant that are used and the amounts of dispersant adhering to expanded particles are more consistent from plant to plant, allowing expanded particles and expanded particle moldings of more consistent quality to be produced. Meanwhile, in methods where the amount of dispersant is increased to obtain expanded particles that do not fuse together, it is necessary to wash the resulting expanded particles to reduce the amount of dispersant adhering to the surface of the expanded particles. The reason is that the fusing properties between the expanded particles must be improved by high-temperature steam when expanded particle moldings are produced using expanded particles with large amounts of dispersant adhering to the surface. However, since the expanded particles do not need to be washed when expanded particles are obtained by the method of the present invention, the costs associated with washing and wastewater disposal are eliminated, allowing better expanded particles to be obtained at a lower cost. Because of the lower amount of dispersant adhering to the surface of the expanded particles, there is no need to use high-temperature steam during the production of expanded particle moldings. The molding cycle can thus be shortened, and productivity can be increased.

DESCRIPTION OF THE PREFERRED EMBODIMENTS

Figure 1:
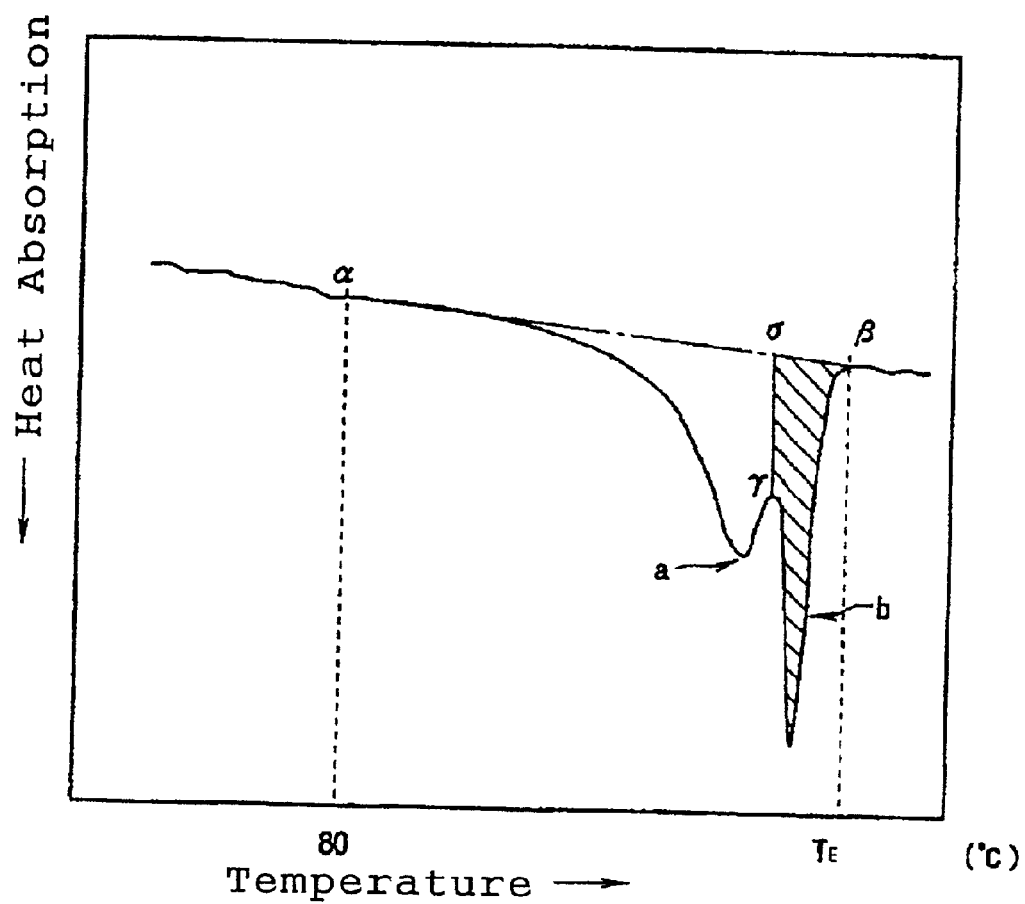
FIG. 1 illustrates a first example of a DSC curve chart for expanded polypropylene particles obtained in the present invention.

An aqueous medium with an electrical conductivity of from not less than 0.00 mS/m to not more than 20.00 mS/m is used in the invention of the present invention. Although the mechanism by which the specific results are brought about when the electrical conductivity of the aqueous medium is within the above range is not yet understood, it is believed that fewer impurities (primarily metal ions) are dissolved into the aqueous medium within the electrical conductivity range specified above, resulting in better dispersion dispersant function, with no need to use large amounts of dispersant, so that the amount of dispersant adhering to the surface of the expanded particles can be kept to a level that will not prevent the particles from fusing together when the expanded particles are molded.

Water with an electrical conductivity of from not less than 0.00 mS/m to not more than 20.00 mS/m is usually used as the aqueous medium. Water with an electrical conductivity outside the range of from not less than 0.00 mS/m to not more than 20.00 mS/m must be adjusted to within that range in order to achieve the object of the present invention. A purification method such as ion exchange, distillation, or reverse osmosis can be used to adjust the electrical conductivity of the water to within the aforementioned range. At least one type of water purified by such a method can be mixed with underground water to adjust the conductivity to within the aforementioned range. The use of water with an electrical conductivity higher than 20.00 mS/m will result in the need for adding grater amounts of dispersant in order to prevent the expanded particles from fusing together when the resin particles are expanded, resulting in greater amounts of dispersant adhering to the surface of the resulting expanded particles, so that the expanded particle moldings obtained by molding such expanded particles will be inferior to poor fusion between the expanded particles and thus poor mechanical strength, etc. For the sake of the fusing properties between particles during the formation of the expanded particles, an electrical conductivity closer to 0.00 mS/m is more desirable, while 0.00 mS/m is even more desirable, but an electrical conductivity less than 0.01 mS/m will be extremely expensive. In consideration of the costs, therefore, and to ensure better fusing between expanded particles when the expanded particles are molded, the electrical conductivity should be at least 0.01 mS/m, and even more preferably at least 0.02 mS/m. The maximum is preferably no more than 17.00 mS/m, and even more preferably no more than 13.00 mS/m. As used in the present Specification, the electrical conductivity is the value obtained by measurement in accordance with the section on electrical conductivity in JIS K 0101 (1979).

The base resin for the polypropylene resin particles used in the method of the present invention can be a polypropylene resin such as a propylene homopolymer or a propylene copolymer. Propylene copolymers should be copolymers of propylene containing at least 60 mol % propylene component, and another comonomer. Examples of other comonomers which can be copolymerized with propylene include α-olefins other than propylene, such as 1-butene, 1-pentene, and 1-hexene. The propylene copolymer may be a binary copolymer such as a propylene-ethylene copolymer or a propylene-butene copolymer, or a ternary copolymer such as propylene-ethylene-butene copolymer. Propylene copolymers may also be either block copolymers or random copolymers. The polypropylene resin may be cross-linked or uncross-linked, but uncross-linked types are preferred for recycling purposes.

The melting point or melt flow rate (MFR) of the base resin of the expanded particles are not particularly limited in the method of the invention, but in consideration of the productivity and equipment costs during the molding of the expanded particles, the temperature in the case of propylene homopolymers, for example, should be at least 145° C., more preferably at least 155° C., even more preferably at least 158° C., and ideally at least 160° C. The maximum melting point is usually about 170° C. When the base resin of the expanded particles is a propylene homopolymer, the MFR should be from not less than 10 to not more than 70 g/10 min for the sake of the effects in further lowering the steam temperature during molding and improving the rigidity of the resulting molded element. The melting point of propylene random copolymers should be no more than 165° C., and more preferably from not less than 135 to not more than 155° C. When the base resin of the expanded particles is a propylene random copolymer, the MFR should be from not less than 0.5 to not more than 12 g/10 min, and even more preferably from not less than 4 to not more than 10 g/10 min, in the interests of improving the heat resistance of the expanded molding and the expansion efficiency during the production of the expanded particles. The MFR refers to the value measured under test conditions 14 of JIS K7210 (1976).

The dispersant should be a microparticulate inorganic substance with a mean particle diameter of from not less than 0.01 to not more than 50.00 μm. The dispersant should be poorly soluble in the dispersion medium, and the dispersant particles should not be susceptible to aggregating together. The dispersant is dispersed in the form of colloid particles in the aqueous medium, which have a surface charge that is the same positive or negative charge as the other particles. Although the mutual attraction based on mass between the colloid particles tends to act in such a way as to cause the particles to aggregate, when they have the same charge, they are kept apart by mutual repulsion. The dispersant function is believed to be the result of the formation of energy "valleys" and the constant distance that is kept between the colloid particles.

In methods where a mixture of the blowing agent-impregnated polypropylene resin particles, aqueous medium, and dispersant is released at reduced pressure and a temperature that is at least the softening point of the resin particles to obtain expanded polypropylene resin particles, inorganic dispersants are preferred because of their good effects and their availability. The repulsion between the inorganic colloid particles is believed to prevent the resin particles from fusing together.

Among the inorganic dispersants described above, mineral-based inorganic substances comprising an aluminosilicate based on silica-alumina are particularly preferred as dispersants in the method of the present invention because lower amounts of dispersant can be used when combined with aqueous medium having an electric conductivity of from not less than 0.00 mS/m to not more than 20.00 mS/m, and because lower amounts of dispersant adhere to the surface of the expanded particles. An advantage of using an inorganic blowing agent as the blowing agent or a blowing agent based thereon is that lower amounts of dispersant can be used when using a mineral-based inorganic substance comprising an aluminosilicate based on silica-alumina. Compared to basic magnesium carbonate dispersants, for example, mineral-based inorganic substances comprising an aluminosilicate will result in good dispersion of the resin particles when used in an amount ⅓ that of basic magnesium carbonates. Examples of aluminosilicates based on alumina-silica include natural or synthetic clay minerals such as kaolin or clay, preferably with a mean particle diameter of no more than 50.00 μm to avoid damaging the surface of the expanded particles. The mean particle diameter should be at least 0.01 μm, more preferably at least 0.05 μm, and even more preferably at least 0.10 μM to ensure better dispersion of the expanded particles without aggregation. The maximum should be no more than 30.00 μm, and preferably no more than 10.00 μm. A portion of the $Si^{4+}$ of aluminosilicates may be ion exchanged with the same type of metal ions such as $Fe^{3+}$, or a portion of the $Al^{3+}$ may be ion exchanged with the same type of metal ions such as $Fe^{2+}$ or $Mg^{2+}$, but the amount should be no more than 20 wt % of the total metal ions. The higher the proportion of ion exchange, the greater the risk that the intended effects of the invention will not be adequately achieved. Although dispersants such as titanium oxide, aluminum oxide, basic magnesium carbonate, basic zinc carbonate, calcium carbonate, and iron oxide can be used, they should be used while blended with the aforementioned aluminosilicates, in which case the amount mixed should be no more than 30 wt % relative to the total amount of dispersant that is used. The mean particle diameter is calculated by means of the particle diameter and the number of particles based on the particle size distribution obtained on the basis of the number of particles using a sedimentation type of particle size distribution analyzer.

A dispersant which is a mineral-based inorganic substance comprising an aluminosilicate based on silica-alumina should be used in an amount of from not less than 0.004 to not more than 1.000 weight part per 100 weight parts aqueous medium in the method of the present invention in order to obtain expanded particles with better fusing properties. Less than 0.004 weight part will result in less resin particle dispersion at a temperature over the softening point of the resin particles. More than 1.000 weight part, on the other hand, will run the risk of more dispersant adhering to the surface of the expanded particles. In view of the above, the amount should be at least 0.010 weight part, preferably at least 0.030 weight part, and even more preferably, for the sake of good resin particle dispersion, at least 0.050 weight part. The maximum should be no more than 0.400 weight part, preferably no more than 0.350 weight part, and even more preferably, to ensure that less dispersant adheres to the surface of the expanded particles, no more than 0.300 weight part.

A dispersion reinforcer for reinforcing the dispersion power of the dispersant may be added as needed. Such dispersion reinforcers, which are inorganic compounds capable of being dissolved in a proportion of at least 1 mg per 100 cc 40° C. water, are inorganic substances in which at least either the anions or cations of the compound are divalent or trivalent. Examples of such inorganic substances include magnesium chloride, magnesium nitrate, magnesium sulfate, aluminum chloride, aluminum nitrate, aluminum sulfate, iron chloride, iron sulfate, and iron nitrate. The dispersant reinforcer is used in an amount of about 0.0001 to 1.0000 weight part. This is particularly effective for further reducing the amount of dispersant when the blowing agent is air or is based on air.

It is assumed that, when a dispersion reinforcer is further added to the aqueous medium, the dispersion system becomes charged or further charged, thereby enhancing the electrical repulsion between the dispersion elements as well as enhancing the electrical repulsion between the dispersion and the polypropylene resin particles, so that there is more dispersant covering the area around the resin particles at a distance without adhering to the surface of the resin particles, and the stronger electrical repulsion between the resin particles prevents the resin particles from fusing together inside the pressure-tight vessel. Accordingly, in the method for producing expanded particles in the present invention, the pH of the aqueous medium in the dispersion system is most effective when at or near the isoelectric point at which the dispersant has no charge.

The amount of dispersant adhering to the polypropylene resin expanded particles obtained by the method of the invention should be from not less than 50 mg to not more than 200 mg per 100 g by weight of the resulting expanded particles (the sum of the weight of the expanded particles themselves and the weight of the dispersant adhering to the surface of the expanded particles) (henceforth, simply expressed as from not less than 50 mg/100 g to not more than 200 mg/100 g) for the sake of better fusion between the expanded particles when molded. More than 200 mg/100 g dispersant adhering to the surface of the expanded particles will result in poor fusion between the expanded particles when molded. When expanded particles with greater amounts of dispersant adhering to them are used in molding, the saturated steam pressure must be increased, tending to result in drawbacks such as moldings with irregular density or uneven fusion or dissolution. Less than 50 mg/100 g dispersant adhering to the particles will result in good fusing properties between the expanded particles when the expanded particles are molded, but will not allow favorable expanded particles to be obtained because the expanded particles tend to fuse together during the step for obtaining the expanded particles. Even more preferably, the amount adhering should be from not less than 50 mg/100 g to not more than 150 mg/100 g. Aqueous medium with an electrical conductivity of from not less than 0.00 mS/m to not more than 20.00 mS/m should be used, and from not less than 0.004 to not more than 1.000 weight part mineral-based inorganic substance comprising an aluminosilicate based on silica-alumina per 100 weight parts aqueous medium should be used in order to ensure that the amount of dispersant adhering to the resulting expanded particles is from not less than 50 mg/100 g to not more than 200 mg/100 g.

The amount of dispersant adhering to the surface of the polypropylene resin expanded particles can be quantitated in the following manner. That is, the resulting polypropylene resin expanded particles are dried for 24 hours in a 60° C. oven, and the expanded particles are then taken out of the oven and immediately placed for 72 hours in a chamber set to a temperature of 23° C. and a relative humidity of 50%. The weight of 100 g expanded particles determined precisely to the third decimal place (rounded off the third decimal place) in a chamber set to the same conditions is used to determine the weight of the expanded particles with dispersant adhering to them: F (g). The total amount of the expanded particles used to determine the weight as described above is immersed and washed in 5 L of 1 N hydrochloric acid aqueous solution, is then immersed in 5 L deionized water to wash off the hydrochloric acid solution, is then immersed and washed in 5 L of 1N hydrochloric acid aqueous solution, and is then immersed in 5 L of deionized water to wash off the sodium hydroxide. These operations are repeated twice, and the total amount of expanded particles is then dried for 24 hours in a 60° C. oven, and then taken out of the oven and immediately put for 72 hours into a chamber adjusted to 23° C. and RH 50%. The weight of expanded particles is then similarly determined in a chamber set to the same conditions: S (g). The difference between the weight F and the weight S is the weight of the dispersant adhering to the surface of the expanded particles, and is the value used to calculate the amount adhering per 100 g expanded particles with dispersant adhering to them.

One or more types of physical blowing agents can be used in the method for producing expanded particles of the invention, such as organic physical blowing agents, including aliphatic hydrocarbons such as propane, butane, hexane, and heptane, alicyclic hydrocarbons such as cyclobutane and cyclohexane, and halohydrocarbons such as chlorofluoromethane, trifluoromethane, 1,2-difluoroethane, 1,2,2,2-tetrafluoroethane, methyl chloride, ethyl chloride, and methylene chloride, as well as inorganic blowing agents such as nitrogen, oxygen, air, carbon dioxide, and water, but for the sake of the environment and safety, inorganic blowing agents such as nitrogen, oxygen, air, carbon dioxide, and water, or blowing agents based thereon, are preferred. Among inorganic blowing agents or blowing agents based thereon, air is preferred for the sake of the environment because expanded particles with a low rate of expansion having an apparent density of from not less than 100 to not more than 500 g/L are readily obtained. The use of air is preferred as the inorganic blowing agent because uniform expanded particles with a low rate of expansion can be obtained with no unexpanded particles.

Carbon dioxide is preferred as the inorganic blowing agent to obtain expanded particles with a high rate of expansion having an apparent density 30 or more and less than 100 g/L. Water can used as the blowing agent when the aqueous medium is water.

In the present Specification, a physical blowing agent based on an inorganic blowing agent means at least 50 mol % of the total blowing agent is an inorganic blowing agent. More preferably, at least 70 mol % of the physical blowing agent is an inorganic blowing agent because it is less of a burden on the environment and poses a lower risk of explosion.

The amount of blowing agent is determined in consideration of the type of base resin, the type of blowing agent, and the like according to the intended rate of expansion of the expanded particles, but is usually at most about 10 weight parts per 100 weight parts resin particles.

The resin particles of the present invention can include various additives as desired. Examples of such additives include antioxidants, UV absorbents, antistatic agents, flame retardants, metal inactivators, pigments, dyes, nucleating agents, or foam regulators. Examples of foam regulators include inorganic powders such as zinc borate, talc, calcium carbonate, borax, and aluminum hydroxide. The content, in terms of the total amount of all additives in the resin particles, should be no more than 20 weight parts, and preferably no more than 5 weight parts, per 100 weight parts resin. Such additives can be added to the resin particles by being kneaded into molten resin in an extruder when the resin particles are formed, for example, by cutting strands extruded from the extruder.

In the method for producing expanded particles in the present invention, the amount of blowing agent loaded into the pressure-tight vessel may be determined according to the type of blowing agent that is used and the intended apparent density of the expanded particles, but in cases, for example, where nitrogen is used as the blowing agent and water is used as the aqueous medium, the pressure (gauge pressure) in the space inside the vessel should be from not less than 0.6 to not more than 1.4 MPa, and preferably from not less than 0.62 to not more than 1.1 MPa, when the state is stable immediately before expansion is begun, which is the state in which the resin particles impregnated with the blowing agent are kept heated without expanding inside the pressure-tight vessel. The pressure in the space inside the vessel should be selected on the basis of the following.

That is, when the target apparent density of the expanded particles has been set, the pressure in the space inside the vessel should be at the higher end of the aforementioned range in cases where the temperature inside the pipe (at the point where the gradually increasing diameter of the pipe is greatest) connected to the release component is kept lower relative to the temperature in the space inside the vessel. When the temperature in the tube connected to the release component is kept relatively higher, the pressure in the space inside the vessel should be at the lower end of the range described above. When the temperature in the tube connected to the release component is kept at a constant temperature, specifically, from not less than 40 to not more than 80° C., then the pressure in the space inside the vessel should be higher, the lower the target apparent density of the expanded particles, and the pressure in the space should be lower, the higher the target apparent density of the expanded particles.

In the method of the present invention, the apparent density is preferably from not less than 100 to not more than 500 g/L in order to more effectively prevent the dispersant from adhering to the surface of the expanded particles. The expanded particles should have an endothermic peak on a DSC curve, as determined by differential scanning calorimetry, of at least 2, and the heat quantity of the endothermic peak on the high temperature side of the endothermic peak (referred to below as high end endothermic peak) should be from not less than 2 J/g to not more than 20 J/g in order to enable the more efficient manufacture of expanded particles having better fusion with other expanded particles. Expanded particles with an apparent density from not less than 100 to not more than 500 g/L and a high end endothermic peak heat quantity of from not less than 2 to not more than 20 J/g will result in expanded moldings with better compression strength relative to density as well as expanded moldings with higher energy absorption, etc., and will allow the molding cycle to be shortened because there will be no need for a step to increase the air pressure in the expanded particles before the expanded particles are molded. When the base resin is polypropylene resin, the apparent density is preferably from not less than 100 to not more than 500 g/L, and the high end endothermic peak heat quantity is preferably from not less than 5 to not more than 15 J/g, so as to obtain expanded moldings with better fusing properties between the expanded particles. The aforementioned high end endothermic peak heat quantity should be from not less than 1 to not more than 50%, more preferably from not less than 2 to not more than 45%, and even more preferably from not less than 3 to not more than 40% relative to the sum of the high end endothermic peak heat quantity b and the intrinsic endothermic peak a shown in FIG. 1. The total heat quantity of the high end endothermic peak and the intrinsic endothermic peak should be from not less than 40 to not more than 150 J/g. The high end endothermic peak heat quantity and intrinsic endothermic peak heat quantity referred to in the present invention both refer to the amount of heat absorption, the value of which is expressed as an absolute value.

An apparent density of 30 or more and less than 100 g/L, an endothermic peak on a DSC curve, as determined by differential calorimetric scanning of the expanded particles, of at least 2, and a high end endothermic peak heat quantity from not less than 5 to not more than 60 J/g are suitable for efficiently obtaining expanded particles to produce expanded moldings with high fusing properties between expanded particles at a high rate of expansion. When the apparent density is 30 or more and less than 100 g/L, and the high end endothermic peak heat quantity is less than 5 J/g, the expanded moldings obtained from such expanded particles will run the risk of a lower compression strength relative to density and lower energy absorption, etc. An apparent density less than 30 g/L will result in expanded moldings with lower compression strength relative to density, lower energy absorption, and the like. Expanded particles with an apparent density of 100 g/L or more and a high end endothermic peak heat quantity over 60 J/g may result in the need for a step to increase the air pressure in the expanded particles before the expanded particles are molded, which may result in a longer molding cycle. Particularly when the base resin is an ethylene-propylene random copolymer, the apparent density should be 30 or more and less than 100 g/L and the high end endothermic peak heat quantity should be from not less than 5 to not more than 30 J/g in order to obtain expanded moldings with better fusing properties between expanded particles, and a shorter molding cycle.

To determine the apparent density d of expanded particles, first approximately 5 g (from not less than 4.500 to not more than 5.500 g) expanded particles are obtained and checked weight precisely to 0.001 g (the fourth decimal place is rounded off) to obtain the weight S (g) of the expanded particles. The volume Y (cm$^3$) of the expanded particles is calculated based on the graduated scale to which the level rises when the expanded particles of known weight are then poured into water in a measuring cylinder holding 100 cm$^3$ of 23° C. water, and it is converted to liter units and expressed as the apparent volume L (L) of the expanded particles. The weight S (g) of the expanded particles determined above is then divided by the volume L (L).

The high end endothermic peak heat quantity of the expanded particles is the heat quantity of the endothermic peak b appearing on the high end side of the two or more endothermic peaks found on a DSC curve (FIG. 1) obtained when from not less than 2 to not more than 10 mg of the expanded particles are heated from ambient temperature to 220° C. at a rate of 10° C./min using a differential scanning calorimeter, and corresponds to the area of the endothermic peak b on the high end side (not necessarily 1). It can be determined in the following manner, for example.

First, a line $\alpha\beta$ is drawn connecting point a corresponding to 80° C. on the DSC curve and point $\beta$ on the DSC curve corresponding to a temperature $T_E$ after the fusion of the expanded particles. A line is drawn parallel to the vertical axis of the graph from point $\gamma$ on the DSC curve in the valley between the aforementioned intrinsic endothermic peak a and the high end endothermic peak b, and the point where the line intersects line $\alpha\beta$ is $\sigma$. The area of the high end endothermic peak b is the area of the portion (portion shaded by slanted lines in FIG. 1) surrounded by the curve of the high end endothermic peak b on the DSC curve, line $\sigma\beta$, and line $\gamma\sigma$, which corresponds to the high end endothermic peak heat quantity. Endothermic peak a in FIG. 1 is the intrinsic peak corresponding to the heat absorbed during the fusion of the base resin.

The high end endothermic peak heat quantity of the endothermic peaks referred to in the present invention among the two or more endothermic peaks on the DSC curve, as determined by differential scanning calorimetry of the expanded particles, means the total quantity of heat of the endothermic peak on the side with the temperature higher than the intrinsic peak corresponding to the absorption of heat during the fusing of the base resin.

Although the high end endothermic peak b is found on the first DSC curve measured in the manner described above, it will not be found on a second DSC curve obtained, after the first DSC curve has been obtained, by lowering the temperature from not less than 220° C. at a rate of 10° C./min to around 40° C., and then increasing the temperature again at a rate of 10° C./min to not more than 220° C., at which time only the intrinsic endothermic peak a corresponding to the absorption of heat during the fusion of the base resin will be found.

Because the value for the high end endothermic peak heat quantity of the expanded particles will vary depending primarily on the expansion temperature during the production of the expanded particles and the amount of blowing agent that is used, it is necessary to establish the conditions of expansion such as the expansion temperature and amount of blowing agent through preliminary testing in order to obtain expanded particles with the target high end endothermic peak heat quantity.

During the measurement of the high end endothermic peak of the expanded particles by differential scanning calorimetry in the aforementioned manner, when each particle weighs less than 2 mg, several particles with a total weight of from not less than 2 to not more than 10 mg should be used as such for measurement; when each particle weighs from not less than 2 to not more than 10 mg, one particle should be used for measurement; and when each particle weighs more than 10 mg, one particle should be cut into several pieces to use one piece weighing from not less than 2 to not more than 10 mg for measurement. However, since the cut samples are obtained by cutting a single expanded particle using a cutter or the like, the particle should be cut in such a way that, when cut, the original surface of the particle remains without being cut off, so that the cut samples each have the same shape as much as possible so that the intact surfaces have the same area as much as possible. For example, if the expanded particles each weigh 18 mg, the particle can be cut horizontally in a given direction through the vertical center of the particle to obtain two cut samples of virtually the same shape weighing about 9 mg, and each cut sample will have the original surface of the expanded particle, the surface area of which will be virtually the same on both cut samples. One of the resulting two cut samples should be used to measure the high end endothermic peak in the manner described above.

When the inorganic blowing agent is air, the expanded particles should usually be produced under conditions resulting in a heat quantity of from not less than 2 to not more than 20 J/g to ascertain the suitable temperature for expansion. When the inorganic blowing agent is carbon dioxide, the expanded particles should be produced under conditions where the high end endothermic peak heat quantity on a DSC curve for the expanded particles is from not less than 5 to not more than 60 J/g. Expanded particles with a high end endothermic peak on a DSC curve obtained by differential scanning calorimetry of expanded particles can be obtained by a method in which resin particles, a dispersant, and a blowing agent are dispersed in a dispersion medium in a pressure-tight vessel, the contents are then heated to any temperature within the range from not less than the melting point (Tm) of the resin particles minus 15° C. to less than a temperature below the temperature of complete fusion (Te) without heating the contents to the temperature of complete fusion (Te). The temperature is then held at the selected temperature (Ta) for a suitable period of time, preferably about 10 to 60 minutes, the contents are then adjusted to any temperature (Tb) in the range from not less than the melting point (Tm) minus 5° C. to not more than the temperature of complete fusion (Te) plus 5° C., and the resin particles are released from inside the vessel and expanded at that temperature (Tb) or after the temperature has been held at that temperature (Tb) for a suitable period of time, preferably about 10 to 60 minutes.

The extent of the high end endothermic peak heat quantity of the expanded particles depends primarily on the aforementioned temperature (Ta) and the time for which the resin particles are held at that temperature during the production of the expanded particles, as well as the aforementioned temperature (Tb), the time that temperature is maintained, and the heating rate. The high end endothermic peak heat quantity of the expanded particles tends to be greater the lower the temperature (Ta) or (Tb) in the temperature retention range and the longer the retention time. The heating rate is ordinarily from not less than 0.5 to not more than 5° C./min. Repeated preliminary testing with the above points taken into consideration will allow the conditions for producing expanded particles showing the desired high end endothermic peak heat quantity to be readily ascertained.

The temperature range described above is a suitable temperature range when an inorganic blowing agent such as carbon dioxide or air is used as the blowing agent. Thus, in cases where an organic blowing is agent is used, the suitable temperature range will be lower than the aforementioned temperature range according to the type and amount used.

Figure 2:
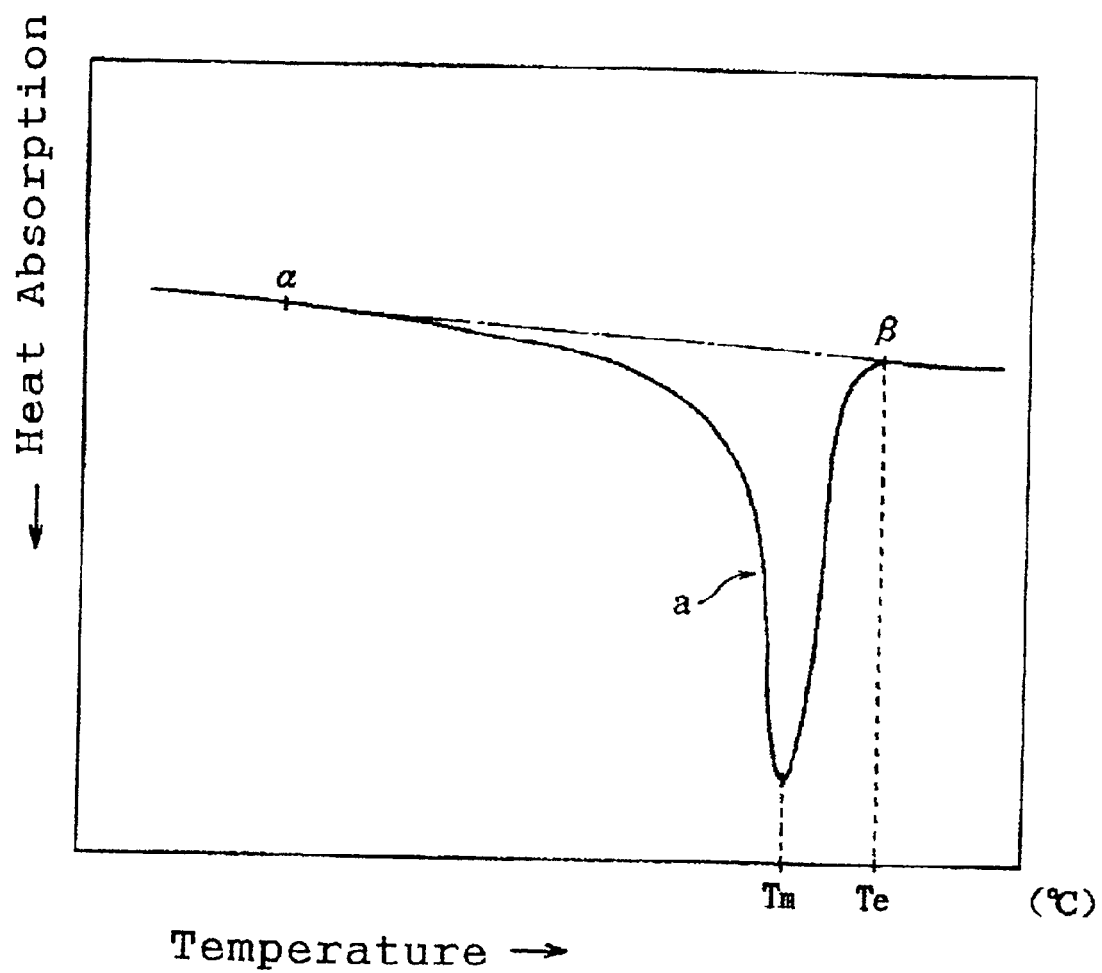
FIG. 2 illustrates a second example of a DSC curve chart for expanded polypropylene particles.

The aforementioned melting point (Tm) is the temperature at the apex of the base resin intrinsic endothermic peak a found on the second DSC curve (example in FIG. 2) which is obtained when a 2 to 10 mg resin particle sample is used for differential scanning calorimetry by the same method used to obtain the DSC curve for the expanded particles described above, and the temperature of complete fusion (Te) is the temperature when the base of the intrinsic endothermic peak a returns to the baseline ($\alpha-\beta$) position on the high temperature side.

Expanded polypropylene resin particles obtained by the method described above can be aged at atmospheric pressure, then pressurized in a pressurized air atmosphere to provide the particles with internal pressure, and then heated with steam or hot air to bring about further expansion so as to produce expanded particles with an even higher rate of expansion.

In a batch molding (in-mold forming) method employed to obtain expanded particle moldings using the above expanded particles, a mold which can be heated and cooled and which can be opened and closed in an air-tight manner is filled with expanded particles, steam with a water vapor pressure of from not less than 0.15 to not more than 0.59 MPa (G) is supplied to cause the expanded particles in the mold to thermally expand and to fuse together, and the molded product is then cooled and taken out of the mold. Expanded particle moldings can also be produced by a continuous molding method (such as those disclosed in Japanese Unexamined Patent Applications (Kokai) H9-104026, H9-104027, and H10-180888), in which expanded particles with internal pressure that has been increased as needed are continuously fed between belts continuously running above and below in a pathway, the expanded articles are expanded and fused while passing through a steam-heated area, they are then passed through a cooling area and cooled, the resulting moldings are taken out of the pathway, and they are sequentially cut to the desired length. When the internal air pressure of the expanded particles is increased, the expanded particles should be placed in a pressure-tight vessel, where they should be kept for a suitable period as pressurized air is fed into the vessel, to allow the pressurized air to penetrate into the expanded particles. Although the density of the moldings produced in the manner described above can be selected as desired according to the intended use, a density of from not less than 40 to not more than 500 g/L, and preferably from not less than 90 to not more than 500 g/L, is the preferred range for selecting the density of moldings obtained from expanded particles in the present invention.

Expanded particle moldings obtained using the expanded particles produced as described above should have an open cell rate of no more than 40%, preferably no more than 30%, and even more preferably no more than 25%, based on Procedure C in ASTM-D2856-70. Moldings with lower open cell rates can be obtained by ensuring that the high end endothermic peak heat quantity of the expanded particles is within the aforementioned range and by avoiding overheating during molding; the lower the open cell rate, the greater the mechanical strength.

The present invention is illustrated in the following examples and comparative examples.

EXAMPLES 1 THROUGH 6, AND COMPARATIVE EXAMPLES 1 THROUGH 5

0.05 weight part foaming regulator was added to an ethylene-propylene random copolymer (2.4 wt % ethylene component content, melting point: 145° C., MFR=7 g/10 min) containing 0.12 part antioxidant, 0.05 weight part calcium stearate (lubricant), 0.05 weight part erucic amide (lubricant), and 0.2 weight part agent for providing weatherability, the ingredients were melt-kneaded in an extruder and then extruded in the form of strands from the extruded, and the strands were cut to an expanded particle diameter/length ratio of about 1.0, giving resin particles weighing an average of 2 mg per particle.

100 weight parts of the aforementioned resin particles, 220 weight parts water with the electrical conductivity given in Table 1, 0.2 weight part surfactant (sodium dodecylbenzenesulfonate), the dispersant shown in Table 1 (kaolin: mean particle diameter 0.40 μm), and a dispersant reinforcer (aluminum sulfate) were charged into a 400 L autoclave (no dispersion reinforcer was added in Examples 3 and 6 or Comparative Examples 4 and 5), and the contents were heated to a temperature 5° C. below the expansion temperature given in Table 1 while stirred and then held for 15 minutes at that temperature. The blowing agent given in Table 1 was fed into the vessel immediately after the temperature retention was begun, and after 15 minutes the pressure in the vessel was adjusted to a level 0.098 MPa (G) lower than the vessel pressure given in Table 1. The contents were then heated to the expansion temperature and held at that temperature for 15 minutes. The foaming agent shown in Table 1 was fed into the vessel immediately after the temperature had thus been held, the temperature was held for 15 minutes, and the pressure in the vessel was adjusted to the vessel pressure given in Table 1. After the contents had been held at the expansion temperature for 15 minutes, one end of the autoclave was opened, and the resin particles and water were released at atmospheric pressure to allow the resin particles to expand, resulting in expanded particles. The material was released as the blowing agent shown in Table 1 was fed into the autoclave in such a way that the pressure in the vessel during the release of the resin particles from the autoclave was held at the vessel pressure shown in Table 1. The resulting expanded particles were washed and centrifuged off and then allowed to stand for 24 hours at atmospheric pressure to age, and the expanded particles were then measured for apparent density, high end endothermic peak heat quantity, and amount of dispersant adhering to the surface of the expanded particles (amounts of adhering dispersant in Table 2), with the results given in Table 2. The dispersion properties of the expanded particles are given in Table 1. The resin particles in Comparative Example 2 fused together in the autoclave, and favorable expanded particles thus could not be obtained.

TABLE 1

|  |  | Examples |  |  |  |  |  | Comparative Examples |  |  |  |  |
|---|---|---|---|---|---|---|---|---|---|---|---|---|
|  |  | 1 | 2 | 3 | 4 | 5 | 6 | 1 | 2 | 3 | 4 | 5 |
| Water | Type | Water C | Water B | Water C | Water D | Water E | Water C | Water F | Water A | Water A | Water A | Water G |
|  | Electric conductivity (mS/m) | 0.05 | 0.85 | 0.05 | 6.62 | 12.20 | 0.05 | 21.90 | 53.30 | 53.30 | 53.30 | 67.90 |
| Blowing agent |  | air | air | carbon dioxide | air | air | air | air | air | air | carbon dioxide | air |
| Dispersant (weight parts) |  | 0.3 | 0.3 | 0.2 | 0.3 | 0.3 | 0.8 | 0.3 | 0.3 | 0.96 | 0.8 | 0.8 |
| Amount of dispersant (weight parts) per 100 weight parts aqueous medium |  | 0.140 | 0.140 | 0.090 | 0.140 | 0.140 | 0.360 | 0.140 | 0.140 | 0.440 | 0.360 | 0.360 |
| Surfactant (weight parts) |  | 0.02 | 0.02 | 0.02 | 0.02 | 0.02 | 0.02 | 0.02 | 0.02 | 0.14 | 0.14 | 0.02 |
| Dispersant reinforcer (weight parts) |  | 0.01 | 0.01 | 0 | 0.01 | 0.01 | 0 | 0.01 | 0.01 | 0.14 | 0 | 0 |
| Expansion temperature (° C.) |  | 156 | 156 | 149 | 156 | 156 | 155 | 156 | — | 156.5 | 148 | 155 |
| Saturated pressure in the vessel (MPa · G) |  | 1.5 | 1.5 | 3.1 | 1.5 | 1.5 | 1.5 | 1.5 | — | 1.2 | 3.1 | 1.5 |
| Expanded particle dispersion properties |  | A | A | A | A | A | A | C | E | A | A | E |

TABLE 2

|  | Examples |  |  |  |  |  | Comparative Examples |  |  |  |  |
|---|---|---|---|---|---|---|---|---|---|---|---|
|  | 1 | 2 | 3 | 4 | 5 | 6 | 1 | 2 | 3 | 4 | 5 |
| Apparent density (g/L) | 105 | 95 | 34 | 105 | 99 | 102 | 95 | — | 173 | 38 | — |
| High end endothermic peak heat quantity (J/g) | 12 | 12 | 20 | 12 | 12 | 16 | 12 | — | 10 | 21 | — |
| Amount of adhering dispersant (mg/100 g) | 110 | 95 | 140 | 100 | 70 | 120 | 190 | — | 380 | 420 | — |
| Mold saturated vapor pressure | 0.41 | 0.41 | 0.31 | 0.41 | 0.41 | 0.41 | 0.41 | — | 0.41 | 0.41 | — |

TABLE 2-continued

|  |  | Examples | | | | | | Comparative Examples | | | | |
|---|---|---|---|---|---|---|---|---|---|---|---|---|
|  |  | 1 | 2 | 3 | 4 | 5 | 6 | 1 | 2 | 3 | 4 | 5 |
| (MPa · G) | | | | | | | | | | | | |
| Expanded particle fusion | Fusion rate (%) | 83 | 72 | 100 | 80 | 56 | 57 | 28 | — | 16 | 0 | — |
| | Evaluated | 0 | 0 | 0 | 0 | 0 | 0 | x | — | x | x | — |

The following types of water were used as the aqueous medium in the examples and comparative examples.

Water A: underground water with electrical conductivity of 53.30 mS/m

Water B: reverse osmosis water with electrical conductivity of 0.85 mS/m

Water C: deionized water with electrical conductivity of 0.05 mS/m

Water D: 9:1 mixture of Water B and Water A, with electrical conductivity of 6.62 mS/m Water E: 8:2 mixture of Water B and Water A, with electrical conductivity of 12.20 mS/m Water F: 6:4 mixture of Water B and Water A, with electrical conductivity of 21.90 mS/m Water G: soft water with electrical conductivity of 67.90 mS/m The aforementioned electrical conductivity is the value obtained at a room temperature of 25° C. using a "Kasutanii ACT pH meter D-24, model 9382-10D" of HORIBA, LTD. with an electrode having a cell constant of $1.071 \times 100$ m$^{-1}$.

The expanded particles of Examples 1, 2, 4, 5, and 6, and Comparative Examples 1 and 3 were packed, without internal pressure treatment, into molds having 250 mm×200 mm×50 mm molding space (molding space when the male and female molds were fully clamped) while the male and female molds were not fully clamped but left open with a slight gap between them (about 1 mm). After the interior of the mold had been evacuated with steam, the male and female molds were fully clamped, and the material was molded with steam having the saturated vapor pressure given in Table 2. After being molded, the molded material was cooled to an in-mold expansion pressure of 0.059 MPa (G), the moldings were taken out of the mold and aged for 24 hours at 60° C., and they were then cooled to room temperature. Table 2 gives the fusion rate and the evaluation of the fusing properties of the expanded particles in the resulting expanded particle moldings.

In Example 3 and Comparative Example 4, on the other hand, the expanded particles were treated to provide them with internal pressure (particle pressure of 0.1 MPa (G)), the expanded particles were packed into molds having 250 mm×200 mm×50 mm molding space (molding space when the male and female molds were fully clamped) while the male and female molds were not fully clamped but left open with a slight gap between them (about 1 mm). After the interior of the mold had been evacuated with steam, the male and female molds were fully clamped, and the material was molded with steam having the saturated vapor pressure given in Table 2.

After being molded, the molded material was cooled to an in-mold expansion pressure of 0.059 MPa (G), the moldings were taken out of the mold and aged for 24 hours at 60° C., and they were then cooled to room temperature. Table 2 gives the fusion rate and the evaluation of the fusing properties of the expanded particles in the resulting expanded particle moldings.

The dispersion properties of the expanded particles and the fusion properties of the expanded particles in the expanded particle moldings shown in Table 2 were evaluated in the following manner.

Dispersion Properties of Expanded Particles 100 expanded elements were randomly selected from the groups of expanded particles that had been prepared. The expanded elements referred to here mean each expanded element in cases of expanded particles with no fusion between the expanded particles, and mean each expanded element of fused particles in cases of expanded particles fused together (referred to as fused particles), whether a plurality of expanded particles have fused together in the form of a string of beads, a plurality of expanded particles have fused together randomly, or a plurality of expanded particles are joined through fibrous resin in the form of threads between the expanded particles. 100 such expanded elements were examined to evaluate the dispersion properties of the expanded particles according to the following criteria.

A: Out of 100 expanded elements, either no fused particles or no more than 2 fused particles comprising two expanded particles fused together, but no fused particles comprising 3 or more expanded particles fused together, indicating excellent expanded particle dispersion B: Out of 100 expanded elements, from not less than 3 to not more than 20 fused particles comprising 2 fused expanded particles, and/or from not less than 1 to not more than 5 fused particles comprising 3 fused expanded particles, but no fused particles comprising 4 or more fused expanded particles, indicating good expanded particle dispersion C: Out of 100 expanded elements, from not less than 26 to not more than 50 fused particles, and/or fused particles comprising from not less than 4 to not more than 6 fused expanded particles, indicating acceptable expansion dispersion D: Out of 100 expanded elements, from not less than 51 to not more than 75 fused particles, and/or fused particles comprising 7 or more fused expanded particles, indicating poor expansion dispersion E: Large fused particles unreleased from inside vessel and left inside Fusing Properties of Expanded Particles in Expanded Particle Moldings Expanded particle moldings obtained in a 250 mm×200 mm×50 mm mold were tested by cutting the molding approximately 10 mm in the thicknesswise direction of the molding with a cutter knife and then manually breaking the molding at the cut to assess the fusing properties of the expanded particles in the moldings according to the following criteria.

O: Observation of the broken surface of the molding revealed more than 50% of the expanded particles had broken Δ: Observation of the broken surface of the molding revealed from not less than 30 and 50% of the expanded particles had broken x: Observation of the broken surface of the molding revealed less than 30% of the expanded particles had broken

What is claimed is:

1. A method for producing expanded particles by allowing polypropylene resin particles impregnated with a physical blowing agent, which have been heated along with an aqueous medium and a dispersant, to be released and expanded at reduced pressure from the interior of a pressure-tight vessel, wherein the dispersant comprises a mineral-based inorganic substance comprising an aluminosilicate based on a silica-alumina, wherein an aqueous medium with an electrical conductivity of from not less than 0.00 mS/m to not more than 20.00 mS/m is used as the aqueous medium.

2. A method for producing expanded polypropylene resin particles according to claim 1, wherein the electrical conductivity of the aqueous medium is from not less than 0.01 mS/m to not more than 20.00 mS/m.

3. A method for producing expanded polypropylene resin particles according to claim 1, wherein the electrical conductivity of the aqueous medium is from not less than 0.01 mS/m to not more than 17.00 mS/m.

4. A method for producing expanded polypropylene resin particles according to claim 1, wherein the electrical conductivity of the aqueous medium is from not less than 0.02 mS/m to not more than 13.00 mS/m.

5. A method for producing expanded polypropylene resin particles according to claim 1, wherein the mineral-based inorganic substance comprising an aluminosilicate based on silica-alumina consists of kaolin.

6. A method for producing expanded polypropylene resin particles according to claim 1, wherein the mineral-based inorganic substance comprising an aluminosilicate based on silica-alumina is used in an amount of from not less than 0.004 weight part to not more than 1.000 weight part per 100 weight parts aqueous medium.

7. A method for producing expanded polypropylene resin particles according to claim 1, wherein the mineral-based inorganic substance comprising an aluminosilicate based on silica-alumina is used in an amount of from not less than 0.010 weight part to not more than 0.400 weight part per 100 weight parts aqueous medium.

8. A method for producing expanded polypropylene resin particles according to claim 1, wherein the physical blowing agent comprises a blowing agent based on an inorganic blowing agent.

9. A method for producing expanded polypropylene resin particles according to claim 1, wherein a blowing agent based on an inorganic blowing agent is used as the physical blowing agent, and a mineral-based inorganic substance comprising an aluminosilicate based on silica-alumina is used as the dispersant.

10. A method for producing expanded polypropylene resin particles according to claim 8, wherein the inorganic blowing agent consists of air.

11. A method for producing expanded polypropylene resin particles according to claim 8, wherein the inorganic blowing agent consists of carbon dioxide.

12. A method for producing expanded polypropylene resin particles according to claim 8, wherein the inorganic blowing agent comprises air and carbon dioxide.

13. A method for producing expanded polypropylene resin particles according to claim 1, wherein air is used as the physical blowing agent, kaolin is used as the dispersant, and aluminum sulfate is used as a dispersion reinforcer.

14. A method for producing expanded polypropylene resin particles according to claim 1, wherein the expanded particles have an apparent density of from not less than 100 g/L to not more than 500 g/L.

15. A method for producing expanded polypropylene resin particles according to claim 1, wherein the endothermic peak of the expanded particles on a DSC curve, as determined by differential scanning calorimetry, is at least 2, and the heat quantity of the endothermic peak on the high temperature side of the endothermic peak is from not less than 2 J/g to not more than 20 J/g.

16. A method for producing expanded polypropylene resin particles according to claim 1, wherein the amount of dispersant adhering to the surface of the expanded particles is from not less than 50 mg to not more than 200 mg per 100 g by weight of the resulting expanded particles (the sum weight of the weight of the expanded particles themselves and the weight of the dispersant adhering to the surface of the expanded particles).

17. A method for producing expanded polypropylene resin particles according to claim 9, wherein the inorganic blowing agent consists of air.

18. A method for producing expanded polypropylene resin particles according to claim 9, wherein the inorganic blowing agent consists of carbon dioxide.

19. A method for producing expanded polypropylene resin particles according to claim 9, wherein the inorganic blowing agent comprises air and carbon dioxide.

* * * * *